United States Patent [19]
Davis et al.

[11] Patent Number: 5,801,595
[45] Date of Patent: Sep. 1, 1998

[54] DEVICE AND METHOD FOR DIGITAL VESTIGIAL SIDEBAND MODULATION

[75] Inventors: Robert C. Davis, Indialantic, Fla.; Edwin R. Twitchell, Quincy, Ill.

[73] Assignee: Harris Corporation, Melbourne, Fla.

[21] Appl. No.: 781,629

[22] Filed: Jan. 10, 1997

[51] Int. Cl.$^6$ .............................. H03C 1/60; H04L 27/04
[52] U.S. Cl. ..................... 332/170; 348/724; 375/270; 375/301
[58] Field of Search .................... 332/170; 375/270, 375/301; 348/724

[56] References Cited

U.S. PATENT DOCUMENTS

| | | |
|---|---|---|
| 5,327,462 | 7/1994 | Takahashi et al. .............. 332/170 |
| 5,592,513 | 1/1997 | Montreuil .......................... 332/103 |

Primary Examiner—Siegfried H. Grimm
Attorney, Agent, or Firm—Rogers & Killeen

[57] ABSTRACT

A digital signal processing device and method for vestigial sideband (VSB) modulation of a digital signal. A $2^n$-ary digital signal $d_i$ is provided to a baseband shaping filter which samples the signal to provide a baseband signal which has real and imaginary portions $Re(S_{bb}(kT))$ and $Im(S_{bb}(kT))$, where $$S_{bb}(kT) = \sum_i (d_i + b) \left( \cos\left(\frac{\pi}{2} i\right) - j\sin\left(\frac{\pi}{2} i\right) \right) h_0((k-i)T)$$

The VSB signal is provided with perfect sideband suppression without using analog filters. The digital signal processing device and method is characterized by requiring minimal bandwidth in the shaping filter.

19 Claims, 4 Drawing Sheets

DEVICE AND METHOD FOR DIGITAL VESTIGIAL SIDEBAND MODULATION

BACKGROUND OF THE INVENTION

The present invention is directed to digital signal processing, and more specifically to a device and method for modulating a digital television (DTV) signal as a vestigial sideband (VSB) signal occupying a standard television channel.

VSB modulation is proposed by the Grand Alliance for the American standard for future broadcast of DTV. The Grand Alliance has proposed a particular type of VSB modulation, known as 8-VSB, which maps 3-bit groups of coded digital data onto one of eight amplitude levels for transmission.

One of the problems encountered in VSB modulation is sideband suppression. Various VSB modulation methods have been proposed which use analog filters (e.g., SAW filters) for sideband suppression. However, analog filters require more bandwidth than is desirable and their use is preferably avoided.

The present invention uses digital signal processing to achieve perfect sideband suppression without analog filters. The processing is characterized by requiring minimal bandwidth in the shaping filter, a characteristic which provides cascaded improvements. For example, a DTV digital signal can be represented over a wider bandwidth for a given sampling rate, which provides the advantage of allowing adaptive corrections in the digital domain to compensate for linear and nonlinear characteristics of high power television transmitters. Further, the present invention allows the control of out-of-band splatter and spectral sidelobes from the television transmitter, thereby reducing interference with adjacent channels. By way of further example, it is known that third order intermodulation products must be included in the signal for predistortion, and the digital processing method and device herein controls the representation of such products within three times the main spectral lobe width of the television signal.

Analog devices are typically manually adjusted, do not track time-varying transmitter distortions, and cannot take advantage of adaptive features allowed by the digital system herein.

As will be developed in the discussion of preferred embodiments, the device and method of vestigial sideband modulation herein may include the provision of an input digital signal (not limited to a DTV signal) at a rate $1/T$ to a multiplier which downconverts the input signal by multiplying it by $e^{-j(2\pi/4T)t}$. The downconverted signal may thereafter be provided to a symmetrical shaping filter which Nyquist filters the downconverted signal and has an impulse response of $h_0(t)$, and the filtered signal may then be upconverted so that it is centered on a carrier frequency, $\omega_0$, in the vestigial sideband of the input signal by multiplying the filtered signal by $e^{j(\omega_0 + (2\pi/4T))t}$ to provide a vestigial sideband modulated output signal. These steps may all be accomplished in a device which has been simplified to take advantage of certain properties of the signals.

Accordingly, it is an object of the present invention to provide a novel device and method for VSB modulation which obviates the problems of the prior art.

It is another object of the present invention to provide a novel device and method for VSB modulating a digital signal which uses digital signal processing to avoid the use of analog filters.

It is yet another object of the present invention to provide a novel digital device and digital signal processing method for VSB modulation in which a digital signal is provided to a baseband shaping filter which provides a baseband signal with real and imaginary portions $\text{Re}(S_{bb}(kT))$ and $\text{Im}(S_{bb}(kT))$, where $$S_{bb}(kT) = \sum_i (d_i + b)\left(\cos\left(\frac{\pi}{2}i\right) - j\sin\left(\frac{\pi}{2}i\right)\right) h_0((k-i)T)$$

and in which the real and imaginary portions are interpolated so that a vestigial sideband modulated output signal includes third order intermodulation distortion products of the signal.

It is still another object of the present invention to provide a novel baseband filter for VSB modulation of a DTV signal which has,

- a multiplier for multiplying an arriving television signal by $(\cos(\pi i/2) - \sin(\pi i/2))$,
- a transversal filter for providing separate sums of even and odd coefficient terms,
- an adder for adding a DC offset term to the sum of even coefficient terms, and
- a multiplexer for multiplexing the sum of odd coefficient terms with the sum of even coefficient terms plus the DC offset term to provide a baseband signal with real and imaginary portions.

It is a further object of the present invention to provide a novel device and method for VSB modulation of a digital signal in a DTV exciter which includes an interpolator for interpolating real and imaginary portions of a signal from a digital baseband filter so that a vestigial sideband modulated output signal includes third order intermodulation distortion products of the digital signal.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
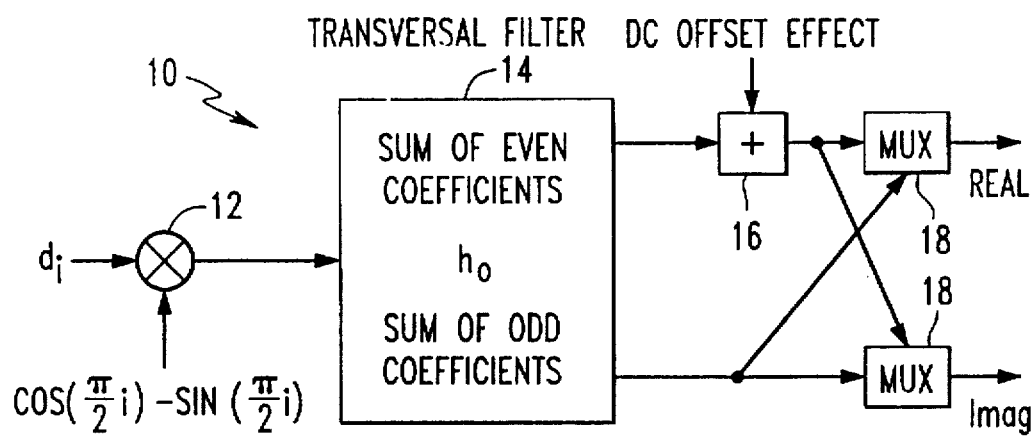
FIG. 1 is a block diagram of an embodiment of the present invention.

With reference now to FIG. 1, an embodiment of a vestigial sideband modulator of the present invention may include a baseband filter 10 which has a multiplier 12 for multiplying an input digital signal $d_i$ arriving at rate $R=1/T$ by (cos (πi/2)−sin (πi/2)), a transversal filter 14 with impulse response $h_0$ for receiving an output from multiplier 12 and for providing separate sums of even and odd filter coefficient terms, an adder 16 for adding a DC offset term to the sum of even coefficient terms, and a multiplexer 18 for multiplexing the sum of odd coefficient terms with the sum of even coefficient terms plus the DC offset term to provide a baseband signal with real and imaginary portions $Re(S_{bb}(kT))$ and $Im(S_{bb}(kT))$, where $$S_{bb}(kT) = \sum_i (d_i + b) \left( \cos\left(\frac{\pi}{2} i\right) - j\sin\left(\frac{\pi}{2} i\right) \right) h_0((k-i)T) \quad (1)$$

The preferred impulse response of transversal filter 14 is $h_0(t)=\Im(H_0(\omega))$, where $\Im$ is the Fourier Transform, and $H_0(\omega)$ is the frequency response of transversal filter 14 centered on zero frequency. The frequency response $H_0(\omega)$ of a symmetrical lowpass shaping filter, such as may be used for transversal filter 14 may be seen in FIG. 2.

The DC offset term added at adder 16 may be (cos (πi/2)−sin (πi/2))$h_0(0)b$, where b is a DC level added to the data for the purpose of inserting some of the carrier frequency $\omega_0$ into the VSB signal as a pilot carrier to support easy carrier recovery in a VSB receiver.

Figure 3:
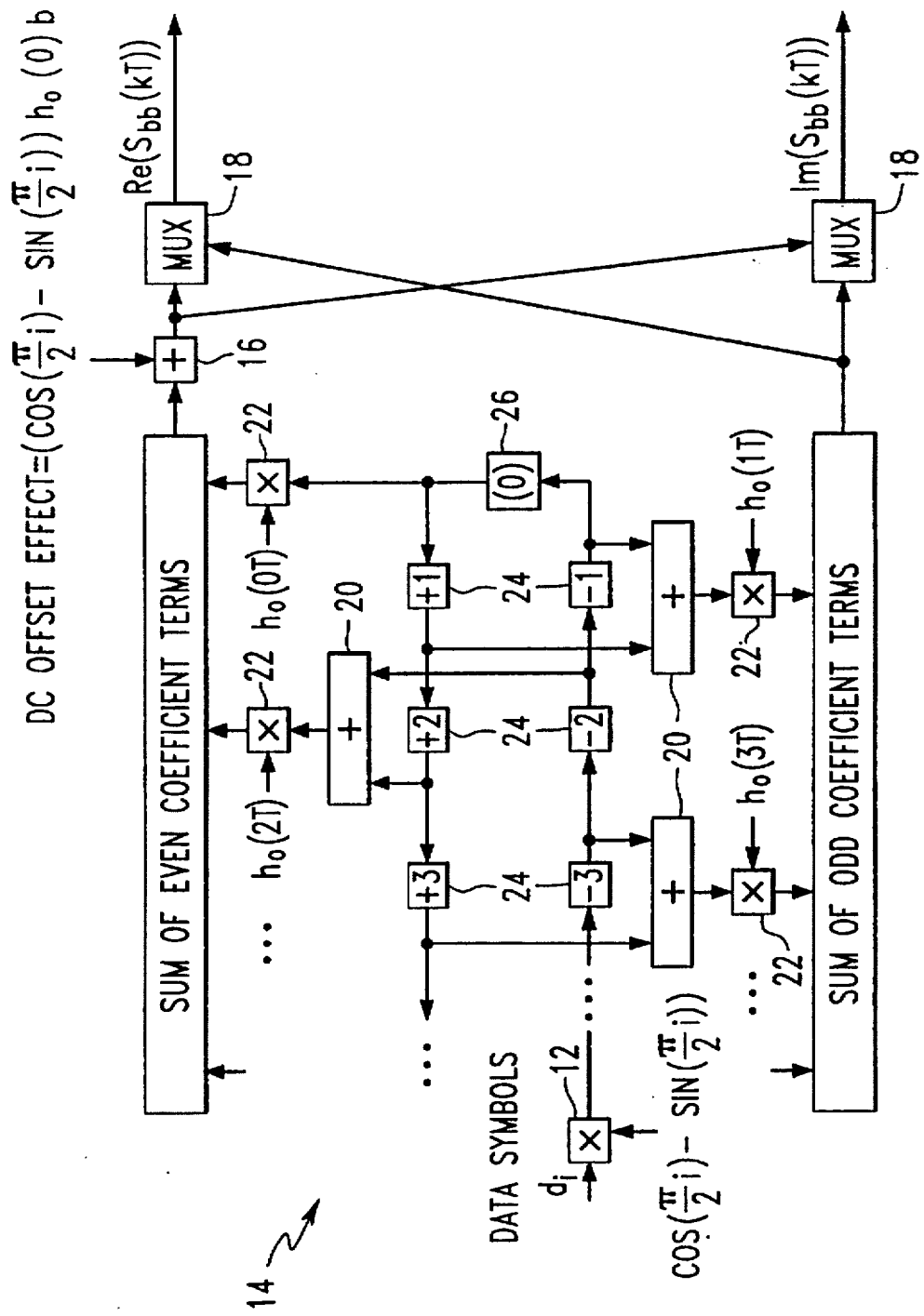
FIG. 3 is block diagram of a further embodiment of the present invention.

A more particular depiction of an embodiment of the present invention is shown in FIG. 3 in which numerical designations of features similar to those of FIG. 1 have been retained in the interest of clarity. In transversal filter 14 pairs of data symbols which are to be weighted by a common coefficient have been combined in adders 20 before weighting by the common coefficient in multipliers 22. As may be noted from FIG. 3 the registers 24 of transversal filter 14 have been "folded" about the central tap weight 26 around which the coefficient values are symmetrically disposed. This arrangement makes it easier to draw the symbol pairs which are to receive equal weight into their respective registers because of the transversal filter's even function impulse response.

Figure 4:
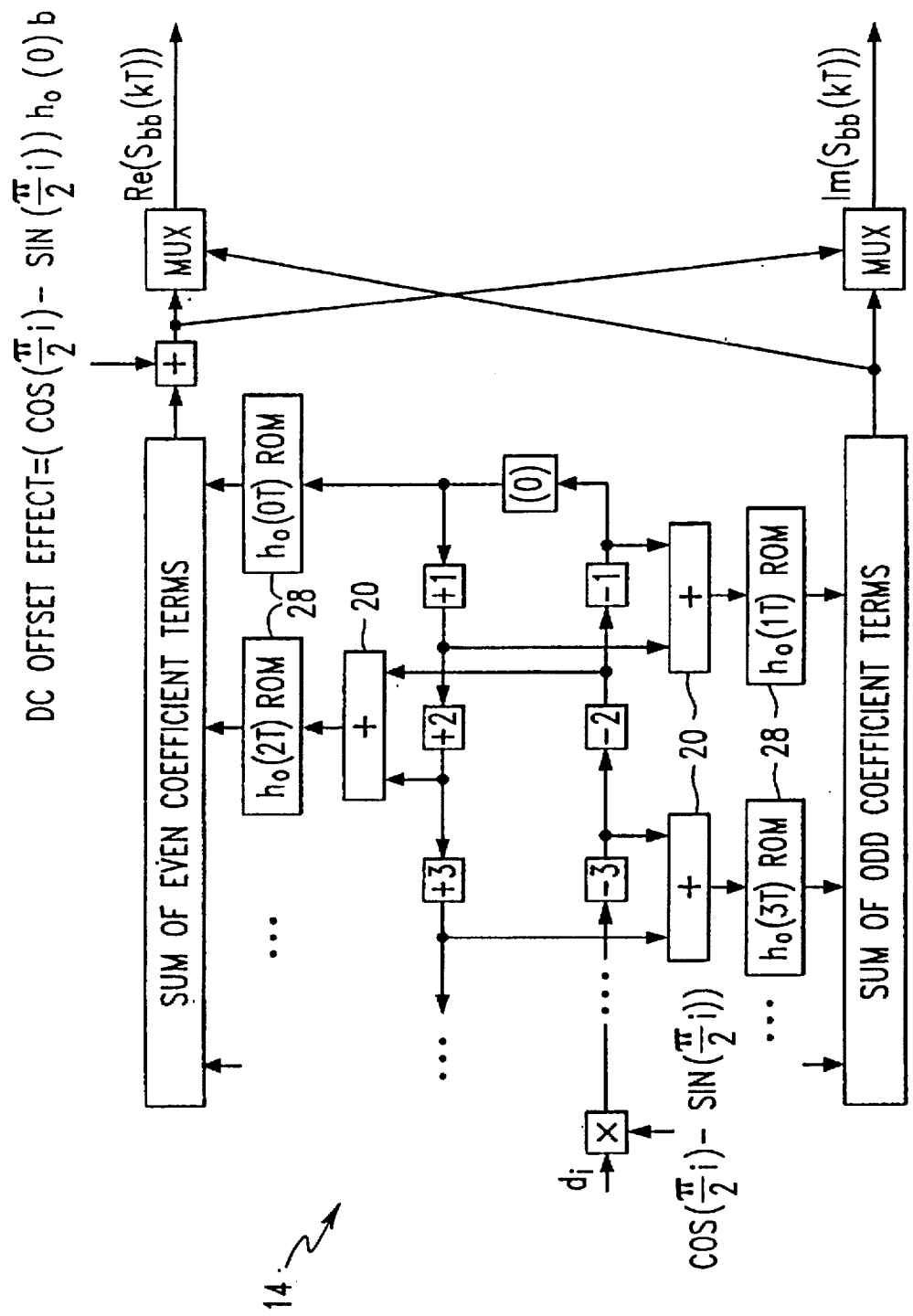
FIG. 4 is block diagram of a further embodiment of the present invention with ROMs instead of multipliers.

With reference now to FIG. 4, in an alternative embodiment multipliers 22 are replaced by read only memories (ROMs) 28. Multipliers may be replaced with ROMs as the inputs thereto are the sums of two n-bit (for $2^n$-VSB) data symbols which can be defined by a (n+1)-bit address which may be used to access from the ROM the result of multiplying the sum by the appropriate transversal filter coefficient. By using ROMs, the use of high speed multipliers or expensive DSP filter chips is avoided, thereby allowing high sampling rates. In an alternative embodiment, multiple addresses may be provided to a single ROM which provides the output previously provided by the sum of multiple ROMs.

Figure 2:
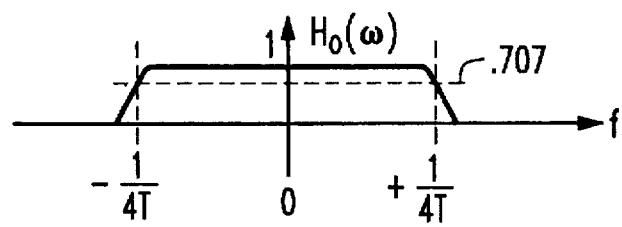
FIG. 2 is a graph depicting the frequency response $H_0(\omega)$ of a symmetrical lowpass shaping filter, such as may be used in the present invention.
Figure 5:
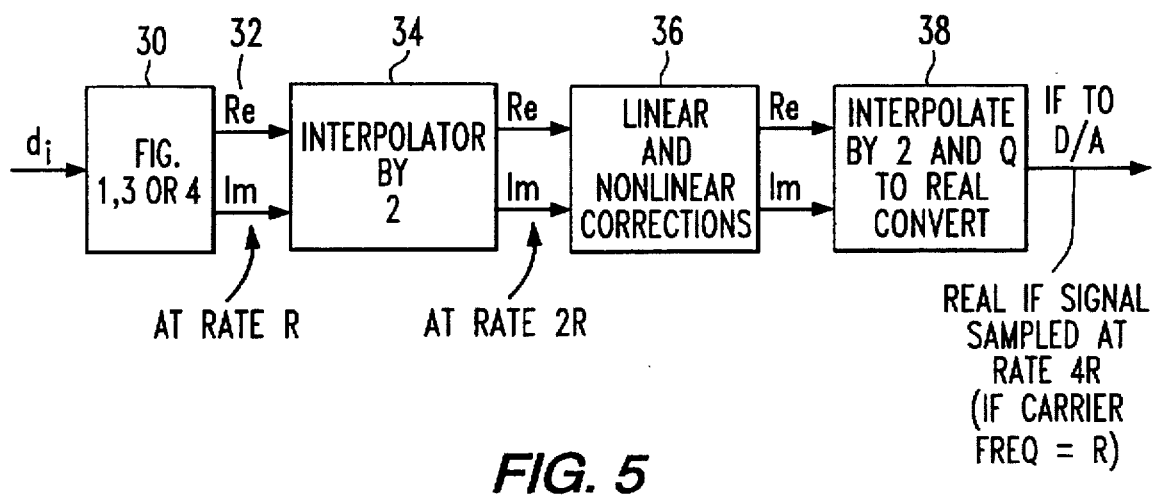
FIG. 5 is a block diagram illustrating application of the present invention in a digital television exciter.

The present invention finds application in an exciter for a digital television transmitter as illustrated in FIG. 5. In this application, the baseband filter 30 may be the embodiment of FIG. 1, 3 or 4 for providing the real and imaginary signals 32. The frequency content of baseband filter 30 is out to a cutoff frequency of R/4 (R=1/T) such as shown in FIG. 2. The rate R imaginary signals represent the signal out to R/2 reasonably well. However, as a further object of the invention is to represent the third order intermodulation products as well as the signal (for predistortion, and building digital linear and nonlinear correctors), three times the bandwidth of the signal is desirably represented. For the signal content of FIG. 2, the signal must be represented out to a bandwidth of 3(R/4). To this end, an interpolator 34 for interpolating by two may be added to increase the sampling rate from R to 2R. Since the output rate is 2R, the signal is well represented out to a bandwidth of R, which is more than sufficient to represent the third order intermodulation products. The output from interpolator 34 may be provided to corrector 36 for linear and nonlinear correction which compensates for distortions downstream from the exciter. The signal from corrector 36 may then be provided to a further interpolator 38 which interpolates by two again and provides digital quadrature modulation onto an intermediate frequency (IF) carrier of frequency R. The output of interpolator 38 has a sampling rate of 4R. Interpolator 34 may be conventional (e.g., a Harris Corporation IC known as a Half Band Filter, HSP43216, operating in the interpolate-by-two mode), as may interpolator 38 which may be a similar half band filter which operates in a quadrature-to-real conversion mode.

The present invention provides numerous advantages, including an all digital implementation (no analog filters for sideband suppression), suitability for low-cost application specific integrated circuit (ASIC) implementation, use of standard ROMs in the embodiment of FIG. 4 to allow high speed sampling, and support for high enough sampling rates to allow signal representation over three times the nominal signal bandwidth to thereby allow digital correction of third order intermodulation products. The present invention provides an output which is digitally correctable so that time-varying transmitter distortions can be tracked and adaptively corrected.

An improved understanding of the operation of the present invention may be obtained by tracking its development. The following discussion starts with a complex signal representation for digital VSB modulation, as shown in FIG. 6, and ends with the embodiment of FIG. 1.

Figure 6:
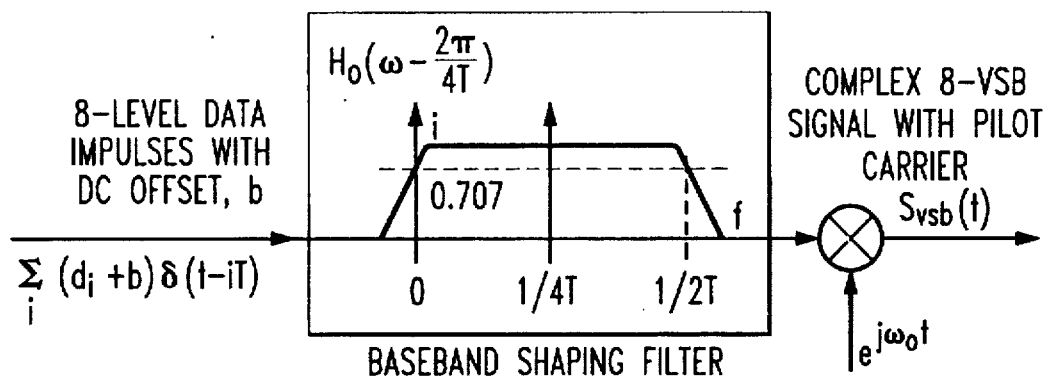
FIG. 6 is partial block and partial circuit diagram showing complex signal flow in a filter for digital VSB modulation.

As shown in FIG. 6, a DC offset b is added to incoming 8-level impulses. As noted above, the DC offset is added to the data for the purpose of inserting some of the carrier frequency $\omega_0$ into the VSB signal as a pilot carrier to support easy carrier recovery in the VSB receiver. The complex signal representation of the output VSB signal in FIG. 6 is:

$$S_{vsb}(t) = \left[ \left( \sum_i (d_i + b)\delta(t - iT) \right) \otimes (e^{-j\frac{2\pi}{4T}t} h_0(t)) \right] e^{j\omega_0 t} \quad (2)$$

where $\otimes$ represents convolution, $h_0(t)=\Im(H_0(\omega))$, $\Im$ is the Fourier Transform, $\delta(t)$ is the Dirac delta function or impulse function occurring at t=0, and $H_0(\omega)$ is the frequency response of the shaping filter centered on zero frequency, such as shown in FIG. 2. The factor $e^{j(2\pi/4T)t}$ accounts for the shaping filter's offset from the carrier by one-fourth the symbol rate of the modulator, and the factor $e^{j\omega_0 t}$ represents the translation of the baseband spectrum to the vestigial sideband carrier frequency $\omega_0$, which is also the pilot frequency.

As the exponential function is distributive across the convolution sign, equation 2 may be rewritten as:

$$S_{vsb}(t) = \left[ \left( \sum_i (d_i + b)\delta(t - iT)e^{-j\frac{2\pi}{4T}t} \right) \otimes h_0(t) \right] e^{j\omega_0 t + j\frac{2\pi}{4T}t} \quad (3)$$

Equation 3 indicates that the DC offset input data signal (shown as the input in FIG. 6) is to be downconverted by one-fourth the symbol rate by multiplying by $e^{-j(2\pi/4T)t}$, and passed through the lowpass filter of FIG. 2 which has impulse response $h_0(t)$. The entire resultant baseband filtered signal (shown inside the brackets in equation 3) is upconverted and centered on a carrier frequency which is one-fourth symbol rate higher than the pilot frequency. The upconversion is represented by the exponential multiplier shown outside the brackets of equation 3. The convolution of equation 3 may then be simplified as shown in equation 4 below.

$$\left[\left(\sum_i (d_i+b)\delta(t-iT)e^{-j(\omega_0-\frac{2\pi}{4T})t}\right) \otimes h_0(t)\right] = \qquad (4)$$

$$\int\left(\sum_i (d_i+b)\delta(t-\tau-iT)e^{-j(\omega_0-\frac{2\pi}{4T})(t-\tau)}\right) h_0(\tau)d\tau =$$

$$\left(\sum_i (d_i+b)\right)e^{-j(\omega_0-\frac{2\pi}{4T})t}h_0(t-iT)$$

in which the last step is achieved by using the sifting property of the delta function which sifts out the value of the integrand at τ=t−iT.

Substituting equation 4 into equation 3 and simplifying yields:

$$S_{vsb}(t) = \left[\sum_i (d_i+b)e^{-j\frac{\pi}{2}i}h_0(t-iT)\right]e^{j(\omega_0+\frac{\pi}{2T})t} = \qquad (5)$$

$$\left[\sum_i (d_i+b)\left[\cos\left(\frac{\pi}{2}i\right)-j\sin\left(\frac{\pi}{2}i\right)\right]h_0(t-iT)\right]e^{j(\omega_0+\frac{\pi}{2T})t}$$

The baseband complex VSB signal is the portion of equation 5 within the outer brackets, which is the desired result (it is the same as equation 1.)

$$S_{bb}(kT) = \sum_i (d_i+b)\left(\cos\left(\frac{\pi}{2}i\right)-j\sin\left(\frac{\pi}{2}i\right)\right)h_0((k-i)T) \qquad (6)$$

Figure 7:
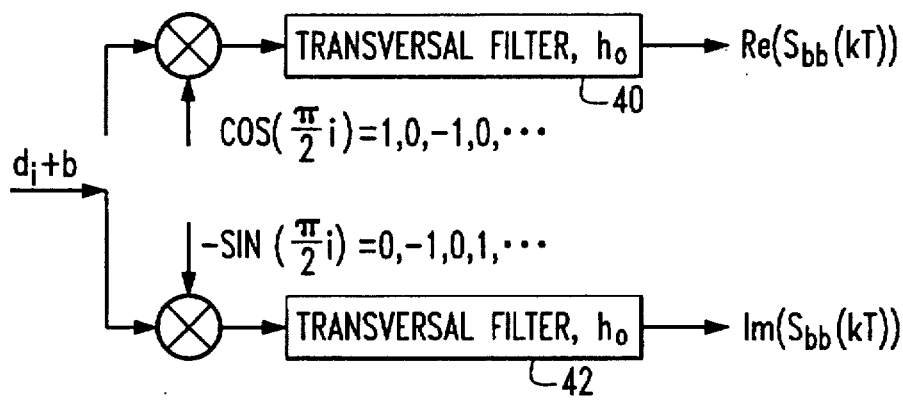
FIG. 7 is a simplified block diagram of an embodiment of a baseband filter.

The signal of equations 1 and 6 may be provided by using a baseband filter such as shown in FIG. 7. This filter may be simplified by noting that the real transversal filter 40 output depends only on odd numbered data symbols while the imaginary transversal filter 42 output depends only on even numbered data symbols. Further, it is noted that the real output alternates between a weighting of the even numbered coefficients of the transversal filter and a weighting of the odd numbered coefficients of the filter, and that the weighting of the imaginary output is opposite in sequence. Thus, the implementation of FIG. 7 can be simplified to that of FIG. 8.

Figure 8:
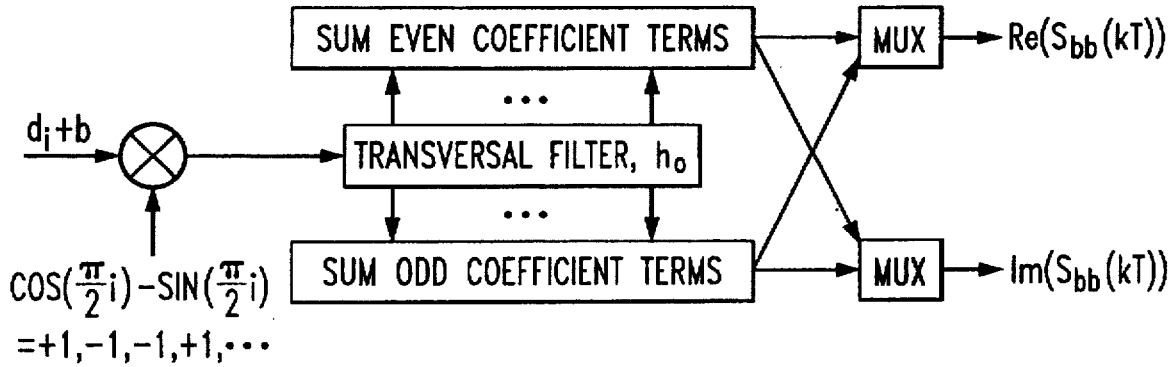
FIG. 8 is a simplified block diagram of a further baseband filter.

The implementation of FIG. 8 may be simplified to that of FIG. 1 by changing the handling of the DC offset. It may be noted that the contribution of the DC offset to the sum of odd coefficients is zero for a filter with an odd number of taps, and that the contribution of DC offset to the sum of even coefficients is a sign-fluctuating constant which is proportional to the DC offset b and to the center tap of the even function transversal filter. The DC offset term added to the sum of even coefficient terms thus may be (cos (πi/2)−sin (πi/2))h₀(0)b.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of vestigial sideband modulation for a digital signal, the method comprising the steps of:
   (a) multiplying a digital signal with data symbols $d_i$ input at rate R=1/T, times (cos (πi/2)−sin (πi/2));
   (b) providing the product to a transversal filter with impulse response $h_0$ which provides separate sums of even and odd transversal filter coefficient terms;
   (c) multiplexing the sums of even and odd coefficient terms to provide a baseband signal with real and imaginary portions Re($S_{bb}$(kT)) and Im($S_{bb}$(kT)), where $$S_{bb}(kT) = \sum_i (d_i+b)\left(\cos\left(\frac{\pi}{2}i\right)-j\sin\left(\frac{\pi}{2}i\right)\right)h_0((k-i)T).$$

2. The method of claim 1 further comprising the step of interpolating Re($S_{bb}$(kT)) and Im($S_{bb}$(kT)) to provide a sampling rate of at least 2R so that a vestigial sideband modulated output signal includes third order intermodulation distortion products of the digital signal.

3. The method of claim 1 further comprising the step of adding a DC offset term, (cos (πi/2)−sin (πi/2))h₀(0)b, to the sum of even coefficient terms, before the multiplexing step.

4. The method of claim 1 further comprising the steps, in the transversal filter, of combining pairs of input data symbols which are to be weighted with a common filter coefficient, and thereafter weighting the combined pairs with their common filter coefficient.

5. The method of claim 4 wherein the step of weighting the combined pairs comprises the step of addressing read only memories which contain addressable products of filter coefficients times input data symbol values.

6. The method of claim 4 further comprising the step of providing an array of registers for the input data symbols, the registers extending in rows from a central tap so that registers for pairs which are to be combined are adjacent.

7. The method of claim 1 wherein the digital signal is a television signal.

8. A method of vestigial sideband modulation for a digital signal, the method comprising the steps of:
   (a) providing an input digital signal at a rate 1/T;
   (b) downconverting the input digital signal by multiplying it by $e^{-j(2\pi/4T)t}$;
   (c) providing the downconverted digital signal to a symmetrical shaping filter which Nyquist filters the downconverted digital signal and has an impulse response of $h_0(t)$; and
   (d) upconverting the filtered digital signal so that it is centered on a carrier frequency, $\omega_0$, in the vestigial sideband of the input digital signal by multiplying the filtered digital signal by $e^{j(\omega_0+(2\pi/4T))t}$.

9. The method of claim 8 further comprising the step of separating the upconverted signal with real and imaginary portions Re($S_{bb}$(kT)) and Im($S_{bb}$(kT)), where $$S_{bb}(kT) = \sum_i (d_i+b)\left(\cos\left(\frac{\pi}{2}i\right)-j\sin\left(\frac{\pi}{2}i\right)\right)h_0((k-i)T).$$

10. The method of claim 9 further comprising the step of interpolating Re($S_{bb}$(kT)) and Im($S_{bb}$(kT)) to provide a vestigial sideband modulated output signal which includes third order intermodulation distortion products of the digital signal.

11. The method of claim 9 further comprising the step, in the filter, of providing separate sums of even and odd coefficient terms.

12. The method of claim 11 further comprising the steps of adding a DC offset term to the sum of even coefficient terms, and multiplexing the sum of odd coefficient terms with the sum of even coefficient terms plus the DC offset term to provide Re($S_{bb}$(kT)) and Im($S_{bb}$(kT)).

13. The method of claim 8 further comprising the step, in the shaping filter, of addressing read only memories which contain addressable products of filter coefficients times input values.

14. The method of claim 8 wherein the digital signal is a television signal.

15. A filter for vestigial sideband modulation of a digital signal, comprising:

a multiplier for multiplying signal data symbols $d_i$ input at rate $R=1/T$, by $(\cos(\pi i/2) - \sin(\pi i/2))$;

a transversal filter with impulse response $h_0$ for receiving an output from said multiplier and for providing separate sums of even and odd transversal filter coefficient terms;

an adder for adding a DC offset term, $(\cos(\pi i/2) - \sin(\pi i/2))h_0(0)b$, to the sum of even coefficient terms; and a multiplexer for multiplexing the sum of odd coefficient terms with the sum of even coefficient terms plus the DC offset term to provide a baseband signal with real and imaginary portions $\text{Re}(S_{bb}(kT))$ and $\text{Im}(S_{bb}(kT))$, where $$S_{bb}(kT) = \sum_i (d_i + b)\left(\cos\left(\frac{\pi}{2}i\right) - j\sin\left(\frac{\pi}{2}i\right)\right)h_0((k-i)T).$$

16. The filter of claim 15 further comprising an interpolator for interpolating $\text{Re}(S_{bb}(kT))$ and $\text{Im}(S_{bb}(kT))$ so that a vestigial sideband modulated output signal includes third order intermodulation distortion products of the signal.

17. The filter of claim 15 wherein said transversal filter comprises plural adders for combining pairs of input data symbols which are to be weighted with a common filter coefficient.

18. The filter of claim 17 wherein said transversal filter further comprises read only memories which contain addressable products of filter coefficients times input values.

19. The filter of claim 17 wherein said transversal filter comprises an array of plural registers for providing input data symbols to said adders, said registers extending symmetrically from a central tap so that pairs of ones of said registers which hold input data symbols which are to be combined are adjacent.

* * * * *